United States Patent [19]

Parsons, Hubert J. et al.

[11] 3,927,583
[45] Dec. 23, 1975

[54] APPARATUS FOR LOADING A WORKPIECE INTO A ROTATING COLLET OR CHUCK

[75] Inventors: Parsons, Hubert J., Horseheads; Anders Adolf Peterson, Elmira, both of N.Y.

[73] Assignee: Hardinge Brothers, Inc., Elmira, N.Y.

[22] Filed: Jan. 11, 1974

[21] Appl. No.: 432,611

[52] U.S. Cl. .................. 82/2.5; 279/1 A; 279/1 ME
[51] Int. Cl.² .......................................... B23B 13/02
[58] Field of Search .............. 82/2.5, 38 R; 279/1 A, 279/1 ME

[56] References Cited
UNITED STATES PATENTS

| 991,785 | 5/1911 | Klocke | 192/25 |
|---|---|---|---|
| 991,786 | 5/1911 | Klocke et al. | 192/25 |
| 2,403,484 | 7/1946 | Ashworth | 408/62 |
| 2,469,160 | 5/1949 | Evans | 279/51 |
| 2,601,494 | 6/1952 | Baule | 279/1 E |
| 3,200,472 | 8/1965 | Kohring et al. | 82/2.7 X |
| 3,576,144 | 4/1971 | Strah | 82/2.5 |
| 3,779,566 | 12/1973 | Tarbox et al. | 279/1 S |

Primary Examiner—Leonidas Vlachos
Attorney, Agent, or Firm—Shlesinger, Arkwright, Garvey & Dinsmore

[57] ABSTRACT

The invention relates to an apparatus for automatically orienting a workpiece with the jaws of a lathe collet and loading it into the collet without the necessity for bringing the rotating spindle to a stop. The apparatus comprises a rotatable loading head oriented such that it may rotate coaxially with the collet, a workpiece gripping device mounted in the face of the loading head oriented toward the chuck or collet, and a spring loaded pin mounted within the loading head and projecting beyond the aforementioned face to engage a corresponding projection on the face of the collet as the latter rotates. As the loader is moved axially toward the rotating chuck or collet, the spring loaded pin is engaged by the rotating pin on the collet or chuck face thereby causing the loading head and the workpiece to be rotated in synchronism with the collet. As the rotating loading head continues to move toward the collet, the spring loaded pin will be depressed thereby permitting the workpiece to be inserted within the jaws of the collet which are then closed thereon.

16 Claims, 6 Drawing Figures

APPARATUS FOR LOADING A WORKPIECE INTO A ROTATING COLLET OR CHUCK

BACKGROUND OF THE INVENTION

In machining operations where a large number of identical articles must be machined, it is often advantageous to eliminate the necessity for the operator to manually load the unmachined workpiece into the collet or chuck. Since manual loading necessarily requires that the lathe spindle be motionless, the operator must wait for the spindle to come to a stop before loading the workpiece. Not only does this result in a considerable loss of operator and machine time, but presents a safety problem since an operator might attempt to load the workpiece before the spindle has come to a complete stop.

A further loss of time is encountered when machining workpieces which must be oriented in a particular manner with respect to the jaws of the collet or chuck as they are loaded. In this situation the operator must first view the collet to ascertain the orientation thereof and then orient the workpiece accordingly before loading it into the collet.

Several disadvantages of prior art loading means of this type lie in their inability to adapt easily to workpieces of varying lengths or spindles of different sizes and occupying various positions relative to the turret in multiple spindle operations. Furthermore, in machining operations wherein the workpiece must achieve a certain orientation relative to the collet or chuck jaws, it is of the utmost importance that the jaws and the means on the spindle or collet for engaging the rotatable portion of the work loader be precisely angularly aligned.

OBJECTS OF THE INVENTION

It is, therefore, an object of this invention to provide a workpiece loader which is adapted to load a workpiece into a rotating collet or chuck without the necessity for first bringing the spindle to a stop.

Another object of this invention is to provide a workpiece loader which is adapted to automatically orient a workpiece with a rotating collet or chuck and the load the workpiece therein. A further object of the invention is to provide a workpiece loader of relatively simple construction and one which may be implemented with little modification of existing machinery.

Yet another object of this invention is to provide a workpiece loader which can easily accommodate workpieces of various lengths and may be integrated into automatic multiple spindle operations.

A still further object of this invention is to provide a workpiece loader wherein a precise relationship between the rotating collet jaws and the workpiece is assured during loading.

These and other objects will be apparent from the description of the presently preferred form of the invention taken in conjunction with the appropriate drawings.

SUMMARY OF THE INVENTION

The invention is an apparatus for loading a workpiece into a rotating collet or chuck comprising a rotatably supported loading head including a face substantially perpendicular to its axis of rotation, work gripping means mounted in the loading head face, a member mounted on the loading head and projecting beyond the loading head face at a point offset from the axis of rotation and means associated with the loading head for yieldably supporting the member against a force acting thereon in a direction normal to the loading head face.

DETAILED DESCRIPTION OF THE PREFERRED EMBODIMENT

Figure 1:
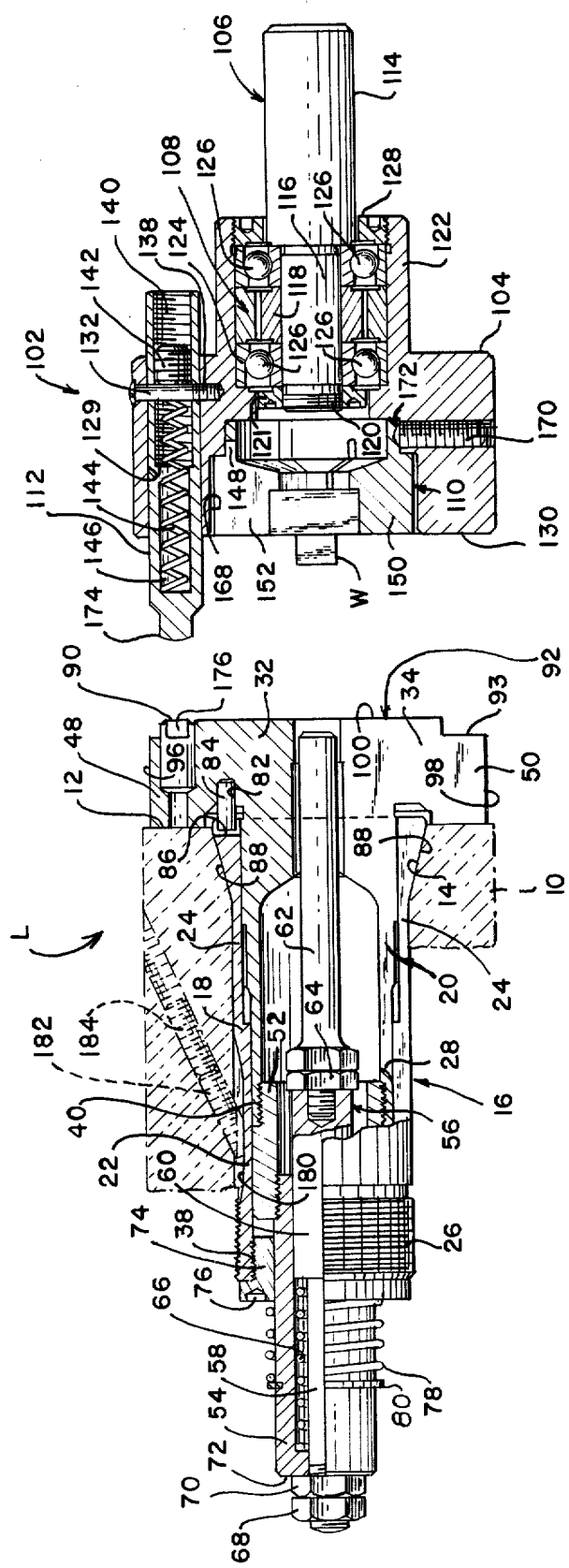
FIG. 1 is a partial sectional side view showing the preferred embodiment of the present invention in relation to the collet and spindle of a typical lathe.

Referring to FIG. 1, the invention is shown in conjunction with a particular type of collet adapted to be used on a standard lathe. The spindle 10 is mounted on the lathe (not shown) in the usual manner and includes a front surface 12 and an annular cam surface 14. A collet 16 is received within the spindle 10 and includes an outer member 18 and an insert member 20. The outer member 18 of collet 16 is of typical construction and includes a generally tubular portion 22 having a plurality of fingers 24 extending therefrom in a forwardly direction. Portion 22 of external member 18 is provided with external threads 26 for attachment to the draw tube (not shown) of the machine tool. Insert 20 includes a tubular portion 28 having a plurality of resilient fingers or jaws 30, 32 and 34 extending therefrom in a forwardly direction separated by longitudinally extending radial slots 36. The jaws 30, 32 and 34 are radially aligned with collet fingers 24. The outer member 18 and insert 20 are internally threaded as at 38 and 40. The jaws 30, 32 and 34 are provided with appropriately shaped work gripping surfaces 40, 42 and 44 and radially extending flange portions 46, 48 and 50 respectively, the latter extending beyond the fingers 24 of collet member 18 and abutting the front surface 12 of spindle 10.

Threaded into tubular portion 28 of insert member 20 is an adaptor 52 to which a spring retainer 54 is threadedly secured. A workpiece ejector 56 is mounted with insert member 20 and spring retainer 54 and includes a rear portion 58, and intermediate portion 60 integral therewith and an ejector pin 62 which is threadedly connected to intermediate portion 60 and locked by means of nut 64. The intermediate and rear portions 60 and 58 slide within spring retainer 54 against the force of coil spring 66. Lock nuts 68 and 70 abut against the rear surface 72 of spring retainer 54 as the ejector 56 is urged in a forwardly direction by spring 66. Positioned around spring retainer 54 and engaging the internal threads 38 of outer member 18 is a spring retainer cap 74. Cap 74 is provided with suitable recesses 76 for engagement by a spanner wrench for tightening it into collet outer member 18. A coil spring 78 is positioned around spring retainer 54 and preloaded by means of a split ring retainer 80. The spring 78 serves to pull the insert member 20 into the collet outer member 18 when the collet 18 is released from a work gripping position.

One of the jaws 32 of the insert member 20 is provided with a bore 82 for receiving a pin 84 which is positioned in such a manner that it will engage a notch 86 in the collet finger 24. By these means, the insert 20 and the outer member 18 will be restrained from rotating with respect to each other such that the same alignment will be achieved each time the insert member 20 is inserted in outer member 18.

In operation, a workpiece is inserted within jaws 40, 42 and 44 of insert 20 thereby depressing the workpiece ejector 56 against the force of spring 66. When the collet outer member 18 is pulled rearwardly by the draw tube, the outer cam surfaces 88 of fingers 24 engage the inner cam surface 14 of spindle 10 thereby closing fingers 24 and causing jaws 30, 32 and 34 to grip the workpiece.

The collet 16 just described may be modified for use with the present invention by mounting a hardened pin 90 in insert member 20 such that it projects beyond the face 92 thereof. To avoid interference with the machining operation, entanglement with the operator's clothing, etc., the face 92 may be provided with an annular recess or step 93 extending from the radial edges 94, 96 and 98 of jaws 30, 32 and 34. The pin 90 will then project beyond the suface of step 93 to a point flush with the surface 100 of face 92.

Figure 2:
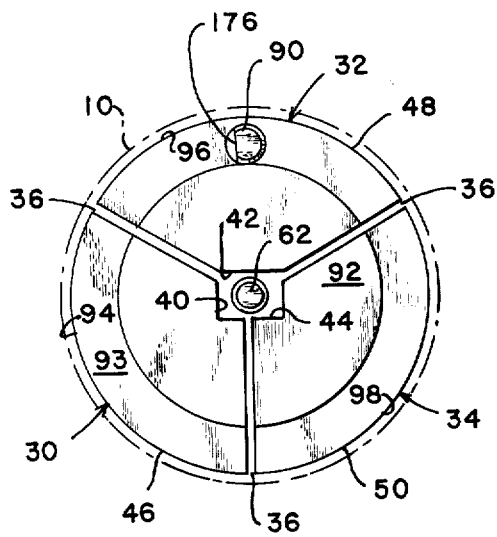
FIg. 2 is an end elevational view of the spindle and collet assembly illustrated in FIG. 1 viewed from the right side thereof.
Figure 3:
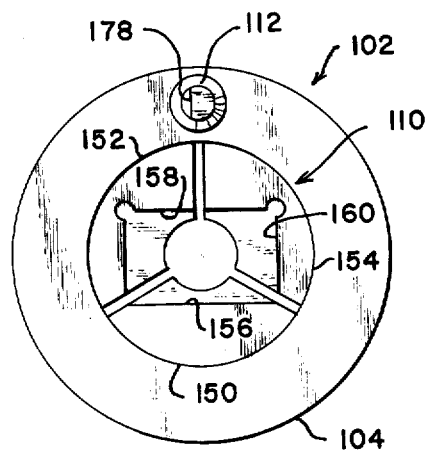
FIG. 3 is an end elevational view of the workpiece loader illustrated in FIG. 1 viewed from the left side thereof and wherein the workpiece has been removed.
Figure 4:
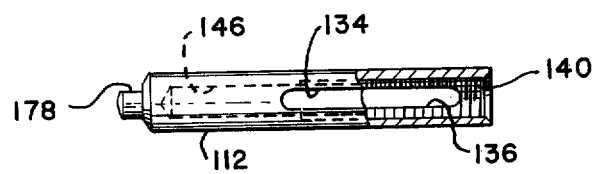
FIg. 4 is a top plan view of the collet engaging pin forming a portion of the present invention with a portion thereof cut away to illustrate the details of construction.
Figure 5:
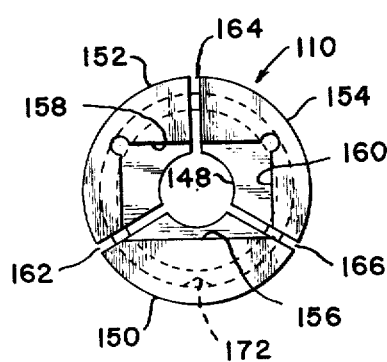
FIG. 5 is an end elevational view of the work gripper forming a part of the present invention.
Figure 6:
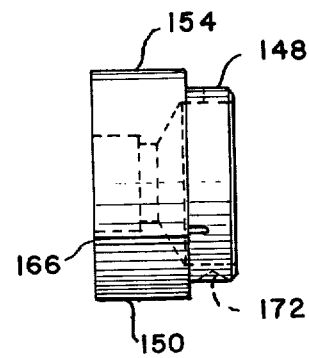
FIg. 6 is a side elevational view of the work gripper illustrated in FIG. 5.

The workpiece loader 102 for use in conjunction with the modified collet illustrated in FIGS. 1 and 2 would preferably be mounted on a turret (not shown) rotatable to any one of a plurality of angularly spaced positions to bring the loader 102 as well as other tooling into position opposite the face 92 of the lathe collet and spindle assembly L. The loader 102 generally comprises a loading head 104 rotatably mounted on a shank 106 by means of pre-loaded bearings 126, a work gripper 110 and a spring loaded pin 112.

The shank 106 is preferably one-piece and includes a rear portion 114 and a forward portion 116. Forward portion 116 is threaded as at 120 to receive spanner nut 121. The rear portion 122 of loading head 104 is rotatably mounted on the forward portion 116 of shank 106 by means of ball bearings 126 which are retained between inner spacer 118 and outer spacer 108. Spanner nut 128 is threadedly secured to a rear portion 122 and serves to retain bearings 126 within loading head 104. Spanner nut 121 performs the same function retaining bearings 126 on forward portion 116.

Hardened pin 112 is slidably mounted within a bore 129 in loading head 104 and projects beyond the face 130 thereof. The pin 112 is retained in bore 129 by means of screw 132 which passes through aligned slots 134 and 136 in pin 112 and is threadedly secured to head 104 as at 138. Pin 112 includes internal threads 140 to received externally threaded screw 142. Coil spring 144 is disposed within the chamber 146 of pin 112 and acts against pin 132 to urge pin 112 in a forwardly direction.

The part gripper 110 is one-piece and comprises a tubular portion 148 and a plurality of spring-like fingers or jaws 150, 152 and 154 extending therefrom in a forwardly direction. The jaws 150, 152 and 154 include work gripping surfaces 156, 158 and 160, respectively, which are contoured in accordance with the shape of the workpiece W to be held. The jaws 150, 152 and 154, which are separated by longitudinally extending radial slots 162, 164 and 166, are closed in slightly so that the workpiece W may be held during the loading cycle but yet easily removed when the jaws 30, 32 and 34 of the collet insert member 20 are closed thereon. The gripper 110 is secured within the recessed portion 168 of loading head 104 by means of a threaded screw 170 which engages a small recess 172 in the tubular portion 148. By varying the angular position of the recess 172, the orientation of the workpiece W with respect to the loading head 104 may be altered. It should be noted that different grippers 110 having distinct jaw configurations and positioning of their recesses will be employed for each different part which is to be loaded.

OPERATION

In operation, the appropriate part gripper 110 is mounted within loading head 104 and the distance which pin 112 projects beyond face 130 is adjusted by means of screw 142 which acts against screw 132 to draw pin 112 rearwardly within head 104 or permits it to extend further beyond face 130 by the action of spring 144. The distance which pin 112 extends beyond face 130 is determined by various factors such as the length of the workpiece W and the collet-to-loader distance. In all circumstances, however, it is necessary that the loading head 104 be rotated in synchronism with the collet 16 before the workpiece W enters the jaws 30, 32 and 34. It should be noted that for operations where synchronizing of the loader and collet is not required, pin 112 may be removed by withdrawing the retaining screw 132.

The workpiece W is then manually inserted into the jaws 150, 152 and 154 of gripper 110 and held there by the resiliency of the jaws which are forces open slightly as the workpiece W is inserted.

The loader 102 is then rotated by the turret into a position directly opposite the lathe collet 116 such that their respective axes of rotation are colinear. The turret and loader 102 are then fed toward the rotating collet and spindle L by means of the turret carriage (not shown) until the nose 174 of pin 112 is engaged by the rotating pin 90 of collet 16. When pin 112 is contacted by pin 90, workhead 104 will be rotated in synchronism with the collet 16. Bearings 126 are preferably pre-loaded to achieve slightly more drag than normal thereby having a braking effect on the loader enabling it to engage and synchronize more smoothly with a minimum of bouncing.

The loading head 104 continues to be fed toward collet 16 until such time as the workpiece W is positioned within jaws 30, 32 and 34. An adjustable stop on the turret carriage (not shown) determines the position. Since pin 112 is spring loaded, it will be depressed by the face of recess 93 as the workpiece W is loaded. When the workpiece W is properly seated within insert 20, ejector pin 62 will be depressed thereby against the force of spring 66. The collet outer member 18 is then drawn rearwardly by the draw tube causing jaws 30, 32 and 34 to close onto the workpiece at which time the loader 102 and turret are retracted by the turret carriage causing workpiece W to be withdrawn from gripper 110 by collet 16. As the loading head 104 is retracted, the nose 174 of pin 112 will remain in contact with pin 90 until such time as screw 142 engages retaining screw 132. This assures synchronization between the gripper 110 and collet insert member 20 as the workpiece is withdrawn.

After retracting the loader 102, the turret may be rotated to the next position to accomplish the appropriate machining on the workpiece and reloading of the gripper 110. When the necesssary machining on the workpiece W has been accomplished, the jaws 30, 32 and 34 will be opened and the workpiece ejected as ejector pin 62 moves there against under the influence of spring 66.

To minimize wear of the two pins 90 and 112, the surfaces 176 and 178 which engage each other are preferably flat and designed to mate thereby distributing the forces on contact.

One of the fingers 24 of collet outer member 18 is provided with a keyway 180 which cooperates with a key screw 182 threadedly mounted in spindle 10 to thereby prevent relative rotation between the keyed finger 24 and spindle 10. A setscrew 184 serves to lock key screw 182 within spindle 10. By positioning the pin 90 on the jaw 32 which is keyed to the finger 24 which in turn is keyed to spindle 10, angular misalignment between collet jaws 30, 32 and 34 and gripper jaws 150, 152 and 154 upon contaact of pins 90 and 112 is prevented.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and as may be applied to the essential features hereinbefore set forth and fall within the scope of this invention or the limits of the appended claims.

We claim:

1. Apparatus for loading a workpiece into a rotating collet or chuck wherein the collet or chuck includes a projection on the face thereof offset from its axis of rotation, said apparatus comprising:
   a. a loading head.
   b. means for rotatably supporting said loading head coaxially with the collet or chuck,
   c. said loading head including a face substantially perpendicular to the axis of rotation of said loading head,
   d. means on said loading head face for mounting work gripping means thereto,
   e. pin means for engaging the projection on the face of the collet or chuck as it rotates,
   f. said pin means being mounted on said loading head and projecting beyond said loading head face at a point offset from the axis of rotation thereof,
   g. means associated with said loading head for yieldably supporting said pin means against a force acting thereon in a direction substantially normal to said loading head face, and
   h. means associated with said pin means and said loading head for adjusting the distance said pin means projects beyond said loading head face.

2. The apparatus of claim 1 and wherein said pin means is slidably mounted in said loading head.

3. The apparatus of claim 2 and wherein said means for adjusting includes a screw cooperating with a threaded bore in said pin means.

4. The apparatus of claim 2 and wherein said pin means includes a flat surface lying substantially parallel to said axis of rotation.

5. The apparatus of claim 2 and wherein said means for supporting said pin means includes a spring acting against said pin means.

6. The apparatus of claim 1 and wherein said means for supporting said locating head includes bearing means which are pre-loaded to exert a rotational drag on said loading head.

7. The apparatus of claim 1 and including:
   a. work gripping means mounted in said loading head face,
   b. means for angularly adjusting the orientation of said work gripping means in said loading head about said axis of rotation.

8. In combination:
   a. rotatable collet or chuck means including a face substantially perpendicular to the axis of rotation,
   b. a first projection on said face offset from said axis of rotation,
   c. a loading head,
   d. means for rotatably supporting said loading head coaxially with said axis of rotation of said collet or chuck means,
   e. said loading head having a face substantially perpendicular to the axis of rotation of said loading head,
   f. means associated with said loading head for supporting work gripping means in said loading head face,
   g. pin means for engaging said first projection when said collet or chuck means is rotated to thereby impart to said loading head rotation synchronous with said collet or chuck means,
   h. said pin means being mounted on said loading head and projecting beyond said loading head face at a point offset from the axis of rotation thereof,
   i. means associated with said loading head for yieldably supporting said pin means against a force acting thereon in a direction substantially normal to said loading head face, and
   j. means associated with said pin means and said loading head for adjusting the distance said pin means projects beyond said loading head face.

9. The combination of claim 8 and wherein:
   a. said collet or chuck means face includes an annular step,
   b. said first projection is positioned on said step.

10. The combination of claim 8 and wherein said first projection is a pin rigidly mounted on said collet or chuck means face.

11. The combination of claim 8 and including means within said collet or chuck means for automatically ejecting a workpiece when said collet or chuck means is opened.

12. The combination of claim 8 and wherein:
   a. said collet or chuck means includes a plurality of cooperating jaw means,
   b. said first projection is positioned on one of said jaw means.

13. The combination of claim 8 and includng means associated with said collet or chuck means for preventing relative rotation between said plurality of jaw means and said first projection.

14. The combination of claim 13 including a spindle and wherein said means for preventing relative rotation includes means for preventing relative rotation between said one of said jaw means and said spindle.

15. The combination of claim 14 and wherein said means for preventing relative rotation between said one of said jaw means and said spindle includes means for keying said one of said jaw means to said spindle.

16. The combination of claim 8 and wherein:
a. said first projection includes a flat surface,
b. said pin means includes a flat surface adapted to contact said first mentioned flat surface when said projection and said pin means engage.

* * * * *